(12) United States Patent
Huffman et al.

(10) Patent No.: US 12,223,750 B1
(45) Date of Patent: Feb. 11, 2025

(54) SYSTEM AND METHOD FOR DETERMINING BACKFINNED LOINS

(71) Applicant: Triumph Foods, LLC, St. Joseph, MO (US)

(72) Inventors: Nicholas Huffman, Helena, MO (US); Matthew England, Kansas City, MO (US); David McCulloch, Amity, MO (US)

(73) Assignee: TRIUMPH FOODS, LLC, St. Joseph, MO (US)

( * ) Notice: Subject to any disclaimer, the term of this patent is extended or adjusted under 35 U.S.C. 154(b) by 0 days.

(21) Appl. No.: 18/422,651

(22) Filed: Jan. 25, 2024

Related U.S. Application Data

(60) Provisional application No. 63/483,215, filed on Feb. 3, 2023.

(51) Int. Cl.
*G06K 9/00* (2022.01)
*A22C 17/00* (2006.01)
(Continued)

(52) U.S. Cl.
CPC .......... *G06V 20/68* (2022.01); *A22C 17/0073* (2013.01); *G06V 10/40* (2022.01); *G06V 10/764* (2022.01); *G06V 10/776* (2022.01)

(58) Field of Classification Search
CPC ........ G06V 20/68; G06V 10/82; G06V 20/52; G06V 20/64; G06V 10/765; G06V 2201/08; G06V 10/70; G06V 20/20; G06V 20/36; G06V 10/764; G06V 10/56; G06V 20/194; G06V 40/107; G06V 10/26; G06V 10/454; G06V 10/22; G06V 10/25; G06V 40/172;
(Continued)

(56) References Cited

U.S. PATENT DOCUMENTS 4,226,540 A   10/1980 Barten et al.
4,908,703 A    3/1990 Jensen et al.
(Continued)

FOREIGN PATENT DOCUMENTS

CN   112218729 A   1/2021
CN   113396020 A   9/2021
(Continued)

OTHER PUBLICATIONS

J. A. Bacus, "Identification of Pork Meat Freshness Using Neural Networks," 2021 IEEE International Conference on Electronic Technology, Communication and Information (ICETCI), Changchun, China, 2021, pp. 402-405 (Year: 2021).*
(Continued)

*Primary Examiner* — Alex Kok S Liew
(74) *Attorney, Agent, or Firm* — Husch Blackwell LLP

(57) ABSTRACT

The disclosure relates to a system and method for identifying one or more features in a meat sample. In one embodiment, the system and method disclosed herein uses automated methods to identify a backfinned pork loin and a non-backfinned pork loin. The system and method disclosed herein comprises imaging a meat sample with an imaging device to obtain one or more images; and using an iteratively trained feature detection model to detect and identify one or more features, including the presence or absence of the features in the images of the meat sample.

13 Claims, 6 Drawing Sheets

(51) Int. Cl.
  *G06V 10/40* (2022.01)
  *G06V 10/764* (2022.01)
  *G06V 10/776* (2022.01)
  *G06V 20/68* (2022.01)

(58) Field of Classification Search
  CPC ...... G06V 40/28; G06V 10/143; G06V 10/17;
           G06V 10/803; G06V 20/647; G06V
           40/161; G06V 40/166; G06V 10/44;
           G06V 10/60; G06V 10/776; G06V 20/66;
           G06V 10/141; G06V 10/245; G06V
           10/40; G06V 10/809; G06V 20/00; G06V
           20/10; G06V 20/44; G06V 2201/06;
           G06V 10/10; G06V 10/145
  See application file for complete search history.

(56) References Cited

U.S. PATENT DOCUMENTS

| | | | |
|---|---|---|---|
| 5,215,772 A * | 6/1993 | Roth | A22C 17/002 |
| | | | 426/480 |
| 5,944,598 A | 8/1999 | Tong et al. | |
| 6,099,473 A | 8/2000 | Liu et al. | |
| 6,104,827 A | 8/2000 | Benn et al. | |
| 6,198,834 B1 | 3/2001 | Belk et al. | |
| 6,317,516 B1 | 11/2001 | Thomsen et al. | |
| 6,751,364 B2 | 6/2004 | Haagensen et al. | |
| 6,891,961 B2 | 5/2005 | Eger et al. | |
| 7,929,731 B2 | 4/2011 | Schimitzek | |
| 7,988,542 B1 * | 8/2011 | Yamase | A22C 25/16 |
| | | | 452/150 |
| 8,260,005 B2 | 9/2012 | Tomic et al. | |
| 8,774,469 B2 | 7/2014 | Subbiah et al. | |
| 9,159,126 B2 | 10/2015 | Johnson | |
| 9,546,904 B2 | 1/2017 | Pawluczyk et al. | |
| 9,546,968 B2 | 1/2017 | Cooke | |
| 10,323,983 B1 * | 6/2019 | Iyer | G01J 3/0202 |
| 10,458,965 B1 * | 10/2019 | Iyer | G01N 21/251 |
| 10,806,153 B2 | 10/2020 | Hanning et al. | |
| 11,275,069 B2 | 3/2022 | Joyce et al. | |
| 11,363,909 B2 | 6/2022 | Hendershot et al. | |
| 11,410,295 B2 | 8/2022 | Nipe et al. | |
| 2003/0072472 A1 | 4/2003 | Haagensen et al. | |
| 2011/0069872 A1 | 3/2011 | Martel et al. | |
| 2020/0288729 A1 | 9/2020 | Blaine et al. | |
| 2021/0015113 A1 | 1/2021 | Aggarwal et al. | |
| 2022/0026259 A1 | 1/2022 | Villerup et al. | |
| 2022/0061340 A1 | 3/2022 | Hjálmarsson et al. | |
| 2022/0323997 A1 | 10/2022 | Pawluczyk et al. | |

FOREIGN PATENT DOCUMENTS

| | | |
|---|---|---|
| CN | 111860652 B | 3/2022 |
| CN | 113155946 B | 10/2022 |
| CN | 112801118 B | 2/2024 |
| DE | 10050836 A1 | 6/2002 |
| DE | 19952628 B4 | 3/2004 |
| EP | 2503331 A2 | 9/2012 |
| EP | 2972152 A1 | 1/2016 |
| EP | 2972152 A4 | 2/2018 |
| EP | 3830550 A1 | 6/2021 |
| EP | 3830550 A4 | 3/2022 |
| EP | 4018180 A1 | 6/2022 |
| JP | 6401411 B1 | 10/2018 |
| JP | 2021192019 A | 12/2021 |
| KR | 102250864 B1 | 5/2021 |
| MX | 2007010351 A | 1/2009 |
| WO | 1991014180 A1 | 9/1991 |
| WO | 2009087258 A1 | 7/2009 |
| WO | 2014139003 A1 | 9/2014 |
| WO | 2017048783 A1 | 3/2017 |
| WO | 2019232113 A1 | 12/2019 |
| WO | 2020035813 A1 | 2/2020 |
| WO | 2020104636 A1 | 5/2020 |
| WO | 2021022323 A1 | 2/2021 |
| WO | 2021030321 A1 | 2/2021 |
| WO | 2021033012 A1 | 2/2021 |
| WO | 2022261333 A1 | 12/2022 |

OTHER PUBLICATIONS https://marel.com/en/products/vcs-2000/. Accessed Mar. 19, 2024.
https://www.eplusv.com/en/products/pork/vcs-2000/. Accessed Mar. 19, 2024.
Masoumi et al, Weight prediction of pork cuts and tissue composition using spectral graph wavelet, Journal of Food Engineering, Jan. 2021, 11 pages, vol. 299.
Nunes, Trevor Francis, Prediction of Primal and Subprimal Beef Yields With Video Image Analysis, Thesis, Spring 2011, 58 pages, Department of Animal Sciences, Colorado State University.
Nisbet et al., Using in-abattoir 3-dimensional measurements from images of beef carcasses for the prediction of EUROP classification grade and carcass weight, Meat Science, Nov. 9, 2023, 13 pages, vol. 209, Elsevier.
Sun et al., Prediction of pork loin quality using online computer vision system and artificial intelligence model, Meat Science, 2018, pp. 72-77, vol. 140, Elsevier Ltd.

* cited by examiner

FLIPPED RIB

FLIPPED FAT

SYSTEM AND METHOD FOR DETERMINING BACKFINNED LOINS

CROSS-REFERENCE TO RELATED APPLICATIONS

This Application claims priority to U.S. Provisional Patent Application Ser. No. 63/483,215, filed on Feb. 3, 2023, to Nicholas L. W. Huffman et. al., entitled "System and Method for Determining Backfinned Loins," the entire disclosure of which is incorporated herein by reference.

BACKGROUND OF THE INVENTION

The meat processing industry has an interest in maximizing the yield from individual animal carcasses through efficient processing methods in order to optimize meat cuts. For example, slaughterhouse systems can be designed to optimize the sorting and classification of carcasses based on a plurality of characteristics in order to predict cuts that will result in the highest yield for each carcass.

Existing solutions for sorting meat products for commercial cuts use weight as a data input for a sorting process. Weight-based sorting requires precisely calibrated scales and can still result in backfinned loins routing to a bone-in loin processing line, where backfinned loins cannot be properly processed. Other existing solutions do not sort loins according to backfinned versus non-backfinned to improve processing efficiencies. Accordingly, a need exists for an automated, objective, efficient, and accurate identification and classification of one or more features, including backfinned, in a meat sample.

BRIEF SUMMARY OF THE INVENTION

The present invention is directed generally to systems and methods for determining backfinning in meat samples. The system can be provided in the form of an advanced feature detection system designed to determine a plurality of features in a meat sample, including but not limited to backfinning, using an advanced detection training model.

According to a first embodiment, a feature detection system configured to analyze a meat sample can include a data capture device provided in a form of an image capture device. The system can further include a transport system with the meat sample positioned in a field of view of the image capture device. The system may also include a feature detection model including a processor. The processor can be configured to process a plurality of data elements received from the data capture device and identify one or more features of the meat sample. The system can further include an ejector configured to sort the meat sample according to an output of the feature detection model. In some embodiments, the system also includes a notification system designed to generate a notification provided in the form of an identification of the one or more features of the meat sample. In some embodiments, the identification includes a presence or an absence of backfinning in the meat sample. In some embodiments, the feature detection model includes an iteratively trained machine learning model. In some embodiments, the feature detection model includes a training model, a validation model, and a trained model. In some embodiments, the validation model comprises applying one or more detection models to a validation sample set to quantify the accuracy of the one or more detection models. In some embodiments, the validation sample set can include images with associated known attributes. In some embodiments, the plurality of data elements are provided in the form of high-resolution images.

According to a second embodiment, a method for determining a feature of a meat sample comprises capturing a data element provided in a form of an image of the meat sample. The method can further include extracting a feature parameter from the image of the meat sample. The method can also include processing the feature parameter using an iteratively trained feature detection training model. The method can further include determining an identification of the feature of the meat sample. The method can also include generating a signal to an ejector to sort the meat sample based on the identification of the feature. In some embodiments, the feature parameter includes an input vector. In some embodiments, the feature includes the presence or absence of backfinning in the meat sample. In some embodiments, capturing the data element comprises triggering a camera when the meat sample comes within a visual field of the camera.

According to a third embodiment, a method for determining a feature of a meat sample includes collecting an image of the meat sample from a data capture device provided in a form of a camera. The method can also include extracting a feature parameter from the image of the meat sample using a processor. The method can further include processing the feature parameter using an iteratively trained feature detection training model. The method can also include identifying a feature of the meat sample based on the output of the iteratively trained feature detection training model. The method can also include determining an identification of the feature of the meat sample. The method can further include generating a notification comprising the identification of the feature of the meat sample and storing the notification in one or more databases. In some embodiments, the method includes validating the iteratively trained feature detection training model by applying one or more detection models to a validation sample set to quantify the accuracy of the one or more detection models. In some embodiments, the step of identifying the feature of the meat sample is performed by matching one or more model feature parameters of the trained detection model with the feature parameter of the image. In some embodiments, the method also includes generating a signal to an ejector to sort the meat sample based on the identification of the feature. In some embodiments, the ejector can sort the meat sample by routing the samples to a specific processing station, a cutting station, a packaging station, a labeling station or a combination thereof, based on a presence or an absence of one or more features. In some embodiments, the method also includes displaying the notification on a user interface.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

Figure 1:
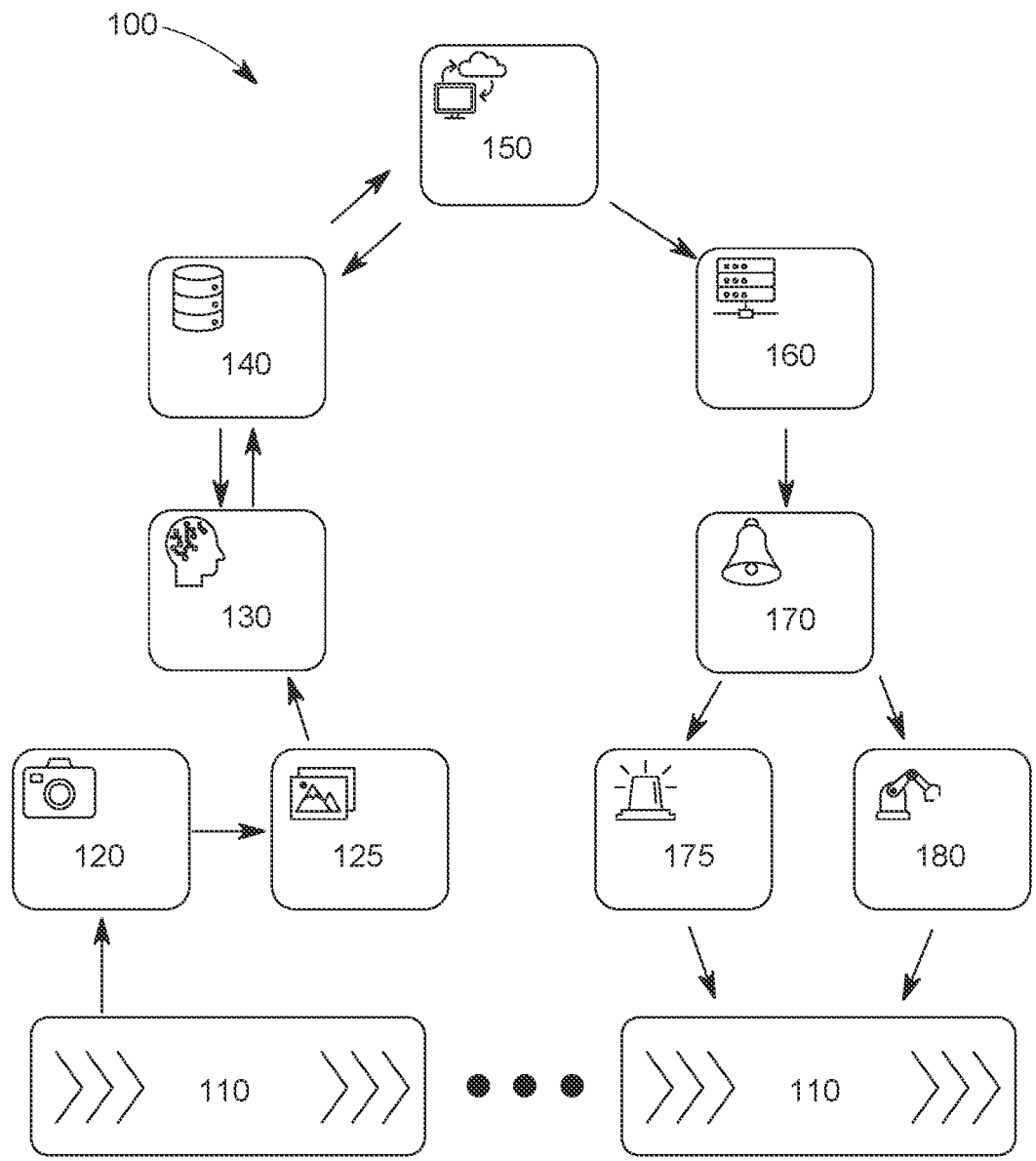
FIG. 1 is a block diagram of an advanced feature detection system for determining a backfinned loin in accordance with an embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. It will be appreciated that some or all of the various features and structures described and shown with respect to each of the specific embodiments referenced herein may be combined to form additional or alternative embodiments having such combinations and that such combinations are within the scope of the present invention.

Referring to the figures, one embodiment and aspect of the present invention is directed toward a system and method for generating a feature detection model to objectively characterize and sort bone-in loins. In one instance, the system and method are specifically adapted for determining the presence of backfinning in a pork loin using advanced image processing techniques and sorting the loin according to the determination. The system and processes described can also be used to iteratively train a detection training module to detect a plurality of features of a meat sample. The system is configured to process and transform raw data elements from a plurality of data sources to provide advanced loin sortation determinations based on detected meat sample features using an advanced detection training module. The system may then use an iteratively trained training module that can be updated and retrained based on updates to the data elements received from a plurality of data sources to provide a more efficient and accurate detection output.

As described in greater detail herein, the system and method of the present invention can allow for the detection of a plurality of meat sample features, like backfinning, on the cut floor. In another embodiment, the detection of a plurality of features can be determined on the kill floor while the carcass is still intact. In one embodiment, the sortation module and feature detection module may be accomplished with and without using weight as inputs. This may in turn allow for cut floor planning early in the processing phases and without a need for consistent scale calibration, thereby leading to increased efficiency and utilization of the processing resources. It will be understood that the systems and methods described herein may be utilized in connection with the processing of carcasses of various meat-producing animals including, but not limited to, hogs, beef cattle, lambs, and others. Additionally, although the system and method described herein are discussed in relation to a loin, it will be understood that other types of primal and subprimal cuts can be processed and sorted using the disclosed system and method and processes described herein. Additionally, although the system and method described herein are related to determining backfinning, other characteristics and features can be determined in connection with the processes described herein.

FIG. 1 illustrates an advanced feature detection system 100 for use in identifying and classifying one or more features in a meat sample, as described herein. In various embodiments, the feature detection system 100 includes a networked system designed to perform one or more processes for advanced image processing and transform data into an objective classification of the presence or absence of a feature based on one or more parameters. The feature detection system 100 may include, but is not limited to, a conveyor belt system 110, one or more data capture devices 120, a plurality of data elements 125, one or more feature detection models 130, one or more databases 140, a network 150, a controller 160, a notification system 170, an alert system 175, and a processing unit 180.

In various embodiments, the conveyor belt system 110 can be designed to transport meat samples (e.g., pork loins) through a meat processing system. According to some embodiments, the conveyor belt system 110 can be provided in the form of a roller system, a timing belt, an automated line system, a chain, a robotic system, or another form of a production line. It will be understood by those skilled in the art that the embodiments described herein that the conveyor belt system 110 may also include additional hardware and software components (not shown) including, but not limited to, sensing devices, controllers, switches, processors, and similar, to facilitate the operation of a production line or similar. In some embodiments, the conveyor belt system 110 can communicate with or be integrated with the network 150 for the overall feature detection system 100 to perform advanced analytics related to the productivity and efficiency of the production line. In another embodiment, the conveyor belt system 110 can be a transportation system for moving meat from one location to a second location. In another embodiment, the conveyor belt system can be communicatively coupled or otherwise integrated with the one or more data capture devices 120. In some embodiments, the conveyor belt system can include one or more integrated scales or other weight capture devices. In some embodiments, a weight measurement detected by the weight capture device(s) can be transmitted to the trained feature detection model.

In various embodiments, the one or more data capture devices 120 can refer to a 2D camera, a 3D camera, an image capture device, scanning device, or other sensing devices. In one embodiment, the one or more data capture devices 120 may include an image sensor system and/or an image data capture system. In one embodiment, the data capture device 120 can be provided in the form of a deep learning camera. In one embodiment, the one or more data capture devices 120 may include a camera configured to obtain image data within a visual field. In at least this embodiment, the data capture device 120 can include a camera designed to trigger when a meat sample comes within the visual field of the camera. In some forms, the data capture device 120 is designed to self-trigger using a photoelectric sensor or similar sensing device that closes an electrical connection when an object passes by the visual field (or other sensing area) of the data capture device 120, In some aspects, the data capture device 120 can be operated in a continuous (or near continuous) mode, such that the data capture device 120 is provided in the form of a live stream capturing image(s) based on an interval of frames per seconds. In some forms, the data capture device can be trained to accept or otherwise filter images where the meat sample is in the correct field of view. The accepted images can be further processed by the trained model. In one non-limiting example, the one or more data capture devices 120 may be configured to capture and/or retrieve the plurality of data elements 125, provided in the form of image files of meat on the conveyor belt system 110. In some embodiments, the image files may be provided in the form of 2D image files, 3D image files, or digital image files.

In one embodiment, the one or more data capture devices 120 may include an image sensor system. The image sensor system can include a presence detector system. In some embodiments, the presence detector system can be a photoelectric sensor (e.g., a photo eye). More specifically, in a non-limiting embodiment, the presence detector system can include a through-beam photoelectric sensor provided in the form of a transmitter and a detector. The transmitter can be designed to emit electromagnetic energy (e.g., infrared electromagnetic energy, visible electromagnetic energy, etc.) toward the detector. In this embodiment, the detector can be designed to detect the electromagnetic energy emitted by the transmitter. If the detector fails to detect the electromagnetic energy, the detector can generate a signal indicative of an object passing between the transmitter and the detector. In other embodiments, the presence detector system may be a through-beam photoelectric sensor that includes a transceiver in place of the detector and a reflector in place of the transmitter. In this alternative embodiment, the transceiver can emit electromagnetic energy toward the reflector, which reflects the electromagnetic energy to the transceiver. When a break in the electromagnetic energy is detected by the transceiver, the transceiver can generate a signal indicative of an object passing between the transceiver and the reflector. In other embodiments, the presence detector system may be a diffusing photoelectric sensor that is located on only one side of the transportation system and is capable of detecting the presence of an object on the conveyor belt system 110.

In one embodiment, the one or more data capture devices 120 can be connected to a computing device (not shown) through a high-speed cable linkage, such as USB 2, Fire-Wire, or through cable linkage to an image capture card on the computer, high-speed wireless linkages (e.g., 802.11n), or other network connections described in connection with the network 150 below, or similar connection, or a combination thereof. In one embodiment, the one or more data capture devices 120 is communicatively coupled to a computing device (not shown) via the network 150. In some embodiments, the one or more data capture devices 120 can be designed to send the plurality of data elements 125 to the computing device via the network 150. In some embodiments, the one or more data capture devices 120 can be provided in the form of a camera or image sensor system with an integrated computing device, processor, or similar.

The computing device can be any device capable of executing processing options, including a network-capable device. The computing device can include a processor and a memory unit. The computing device can further include a display or other interface to configure, monitor, execute, and control various functions of the feature detection system 100. The computing device may include or otherwise be in communication with a processing unit 180. The processing unit 180 can include one or more machines on a production line that are configured to physically process carcasses, as described in more detail below.

In an embodiment where the one or more data capture devices 120 is a camera, and the plurality of data elements 125 are images or image files of meat, the resolution of an image can vary according to the distance of the camera from the surface of the meat. In this embodiment, a method for maintaining a relatively constant distance of the camera from the surface of the meat can be used to maintain a constant resolution in the images.

In one embodiment, the plurality of data elements 125 can include image files captured by the one or more data capture devices 120. In one embodiment, the plurality of data elements 125 can include images of the meat samples on the conveyor belt system 110. In one embodiment, the meat sample is located on the conveyor belt system 110 within the field of view of the one or more data capture devices 120. In some embodiments, the meat sample is specifically positioned on a conveyor belt saddle to align within the field of view of the one or more data capture devices 120.

In this embodiment, the one or more data capture devices 120 can be designed to capture the plurality of data elements 125, including but not limited to images, image files, video files, or a combination thereof. In some embodiments, the image files are minimally compressed to help enhance feature detection. In some embodiments, the image files may be compressed to improve image transfer speeds. It will be recognized by one skilled in the art that other types of data elements are contemplated within the scope of the embodiments described herein, including, for example, size, color, temperature, etc.

In one embodiment, the data capture process (e.g., imaging) can be taken over a short period of time, since the object or meat, on which the measurements are taken are often moving continuously, and the cameras or other data capture devices 120 are fixedly positioned. In some embodiments, the one or more data capture devices 120 may be mounted or positioned using a movable apparatus, including a multi-directional track or adjustable axis device. In one example, exposure timing can be under 1 millisecond. In another embodiment, exposure timing can be under 50 milliseconds. In a third embodiment, exposure timing can be under 125 milliseconds. Techniques for decreasing exposure time can include, for example, increasing the illumination or increasing a camera aperture.

Returning to FIG. 1, in some embodiments, the plurality of data elements 125 can be analyzed using one or more feature detection models 130. In certain embodiments, one or more features are extracted from an image of the meat sample and analyzed using one or more feature detection models 130 to identify a plurality of features and classify the meat sample. In certain embodiments, the plurality of data elements 125 are analyzed using one or more detection models 130 to predict the absence or presence of a plurality of features based on one or more parameters. In some embodiments, there may be multiple feature detection models 130, each develop and trained to detect and classify a particular feature. In other embodiments, the feature detection model 130 may be developed and trained to accurately identify and classify multiple types of features. For example, in one non-limiting embodiment, the feature detection model 130 may be provided in the form of an advanced image processing module, designed to identify the presence of a plurality of features in an image of a meat sample. In this embodiment, the features may include but are not limited to those shown and described in connection with FIGS. 2A-3B.

In certain embodiments, the one or more detection models 130 can include machine learning, artificial intelligence, a linear statistical model, a non-linear model, a logistic regression, a neural network, other processing models, other modeling and analysis techniques, or a combination thereof. In certain embodiments, the one or more models are created using AlexNet™ GoogleNet™, Python™, MatLab™, Cognex VisionPro™, Cognex In-Sight Vision Suite™, AWS SageMaker™, or other publicly available neural networks and/or deep-learning vison tools. The one or more detection models 130 are described in more detail in connection with the processes described in FIGS. 4-6.

The one or more databases 140 can generally refer to internal or external systems, data sources, scanning devices, or other platforms from which various data is received or collected. The one or more databases 140 can include the plurality of data elements 125, individual data points extracted therefrom, or other information processed, collected, or received by the feature detection system 100. The one or more databases 140 can further be used to process, clean, map, triangulate, or validate data across the feature detection system 100 or other embodiments of a networked feature detection system.

The collected data stored in the one or more databases 140 can include the plurality of data elements 125, including images and image files, calibration data, parameter data, validation data, threshold data, etc. The feature detection system 100 can receive or retrieve image data which may include but is not limited to raw data points, pixels, vectors, measurements, or similar information. The information received or collected by the feature detection system 100 can be stored in the one or more databases 140. In some embodiments, the one or more databases 140 can be provided in the form of a memory unit, processor, elastic cache system, cloud storage, or similar.

The one or more databases 140 can include module data associated with iteratively training the detection training module(s) and other modeling processes described herein. Non-limiting examples of module data can include but are not limited to, machine learning techniques, parameters, guidelines, emphasis values (e.g., weight values), input and output datasets, training datasets, validation sets, configuration properties, and other settings. In one example, module data includes a training dataset including historical image data, carcass composition metrics, calibration data, trim specification data, and weight. In this example, the training dataset can be used for training a detection training module to provide an objective feature classification based on a specific feature parameter or other classification value. For example, the system may use the module data to iteratively train a detection training module to identify one or more features of a meat sample, where the feature parameters are modeled based on historical data from the one or more databases 140 while also incorporating new data from expected new meat sample values and carcass characteristics as animal genetics and overall carcass parameters evolve over time.

In some embodiments, the devices and aspects of FIG. 1 can communicate directly with one another over the network 150. The network 150 includes, for example, the Internet, intranets, extranets, wide area networks ("WANs"), local area networks ("LANs"), wired networks, a coaxial cable data communication network, an optical fiber network, a direct wired serial communication connection (e.g., USB), wireless networks, such as a WiFi network, a radio communication network, a cellular data communication network (e.g., 4G, 5G, LTE, etc.), a direct wireless communication connection (e.g., Bluetooth, NFC, etc.), or other suitable networks, or any combination of two or more such networks. For example, such networks can include satellite networks, cable networks, Ethernet networks, and other types of networks. In some embodiments, the network may be a private network (e.g., a private LAN), a public network (e.g., the internet), or a combination of private and/or public networks.

The feature detection system 100 can include one or more controllers 160 provided in the form of a programmable logic controller (PLC), or similar control device. In some embodiments, the one or more controllers 160 can be constructed, programmed, configured, or otherwise adapted, to autonomously carry out a function or set of functions of the processes described herein. A controller 160 can include one or more components, including both software and/or hardware components, including an application-specific integrated circuit (ASIC) or field programmable gate array (FPGA), in some embodiments. In some embodiments, the controller 160 can include a combination of hardware and software, such as by a microprocessor system or similar processor module, wherein the process module can be designed to execute a set of program instructions by the controller to perform one or more steps of the processes provided herein.

In some embodiments, at least a portion of a controller 160 can be executed on the processor(s) of one or more computing platforms or computing devices to execute one or more control functions including but not limited to multitasking, multithreading, distributed (e.g., cluster, peer-peer, cloud, etc.) processing, and similar processing techniques. Further, a controller 160 can further include one or more subassemblies, modules, or similar, each of which can be provided in the form of an individually controlled controller.

Moreover, in the embodiments described herein, the one or more controllers 160 can execute functions autonomously, however semi-autonomous or operator-controlled, or similar, operations are also contemplated in some embodiments. Further, wherein one controller 160 is described to execute an instruction to perform a function herein, it will be understood by one skilled in the art that one or more subassemblies or controllers can execute individual tasks or functions.

The controller 160 can be any device capable of transmitting and/or executing processing instructions, including a network-capable device. The controller 160 can include a processor and a memory. The controller 160 can include a display or other interface to configure, monitor, execute, and control various functions of the feature detection system 100. The controller 160 may include or otherwise be in communication with a processing unit 180. In at least one embodiment, the controller 160 may be designed to receive and process one or more images of the meat sample and/or a weight of the meat sample, and determine the appropriate processing line or processing section for the meat sample. In this embodiment, the controller 160 can send a signal to the processing unit 180 to move or transport the meat sample to the appropriate processing line or processing section. In at least this way, the controller 160 can be provided in the form of a deep learning controller. In some embodiments, the data capture, data processing, and output determination may be performed by a single device configured of hardware and/or software. In some embodiments, the feature detection system 100 can generate a prediction or classification of the presence or absence of a feature in a meat sample. The feature detection system 100 can generate a notification via a notification system 170 to communicate a classification (e.g., presence of backfinning, normal, flipped rib, flipped fat, etc.). In some embodiments, the notification system 170 can include a user interface, a communication interface, or a combination thereof.

In one embodiment, a user interface of the notification system 170 can be a computing device and can be in communication with one or more input or output devices (not shown) that are capable of receiving inputs into and/or outputting any outputs from the computing device or other aspects of the notification system 170. Embodiments of input devices can include but are not limited to, a keyboard, a mouse, a touchscreen display, a touch-sensitive pad, a motion input device, a movement input device, an audio input, a pointing device input, a joystick input, a keypad input, peripheral device, foot switch, or similar input device. Embodiments of output devices can include but are not limited to, an audio output device, a video output, a display device, a motion output device, a movement output device, a printing device, or a similar output device. In some embodiments, the user interface includes hardware that can be designed to communicate with one or more input devices and/or output devices via wired and/or wireless connections.

In some embodiments, the notification system 170 can further include an alert system 175 to provide an audible and/or visual alert at the detection of backfinning. In some embodiments, the alert system 175 can be in communication with the notification system. In some embodiments, both the notification system 170 and the alert system 175 may be provided in the form of integrated subsystems to the controller 160. In some embodiments, the alert system 175 may be provided in the form of a light bar or similar illuminated notification device.

The feature detection system 100 can further include a processing unit 180. The processing unit 180 can include one or more machines on a production line that are configured to physically process carcasses according to the customized processing options generated by the system and processes described herein. In some embodiments, the processing unit 180 can be provided in the form of an ejector designed to sort the meat samples into different sections of the production line according to the output of the feature detection system, as described in more detail in connection with FIG. 4.

The feature detection system 100 may further include a computing environment provided in the form of one or more computing devices that communicate together over the network 150. According to some embodiments, the elements of the computing environment can be provided in the form of a plurality of computing devices that may be arranged, for example, in one or more server banks or computer banks, or other arrangements. Such computing devices can be located in a single installation or may be distributed among many different geographical locations. For example, the computing environment can include a plurality of computing devices that together may include a hosted computing resource, a grid computing resource, and/or any other distributed computing arrangement. In some cases, the computing environment can correspond to an elastic computing resource where the allotted capacity of processing, network, storage, or other computing-related resources may vary over time.

Computing devices and other devices discussed herein can include a memory unit. A memory unit can comprise volatile or non-volatile memory to not only provide space to execute program instructions, algorithms, or the advanced analytics models described herein, but to provide the space to store the instructions, data, and other information. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Figure 2A:
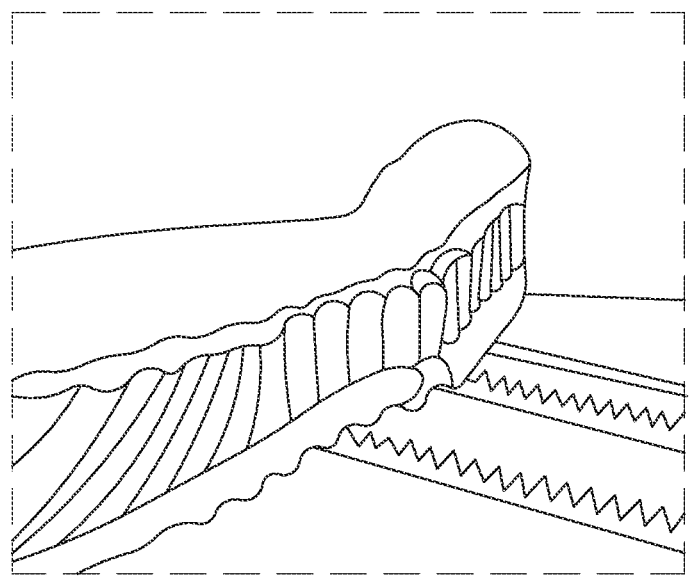
FIG. 2A is a representative diagram of a backfinned pork loin, suitable for identification and classification by the present invention.
Figure 2B:
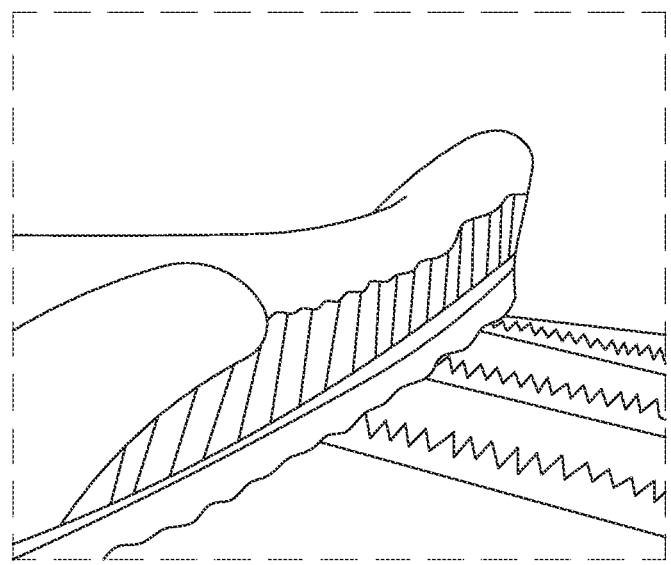
FIG. 2B is a representative diagram of a non-backfinned pork loin, suitable for identification and classification by the present invention.

As shown in FIGS. 2A and 2B, in one embodiment, a high-resolution image is obtained of pork loin. FIG. 2A is a representative illustration of a backfinned pork loin. FIG. 2B is a representative illustration of a non-backfinned pork loin.

Figure 3A:
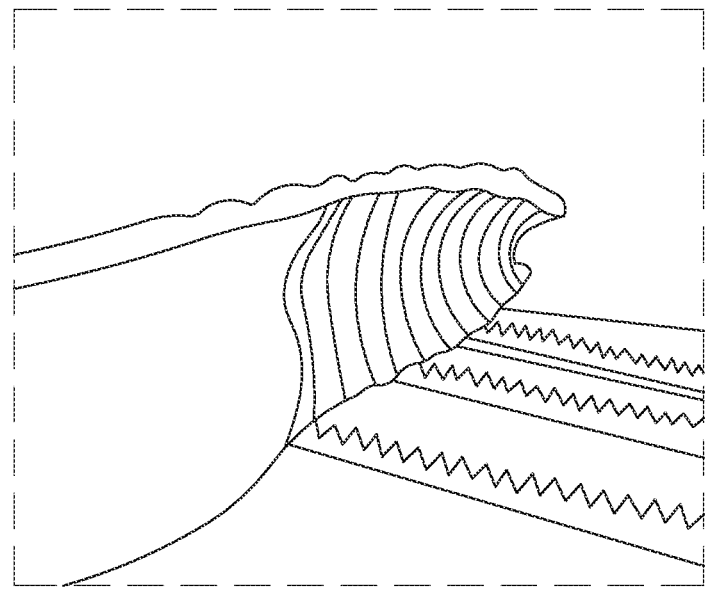
FIG. 3A is a representative diagram of a flipped pork loin with the rib side visible, suitable for identification and classification by the present invention.
Figure 3B:
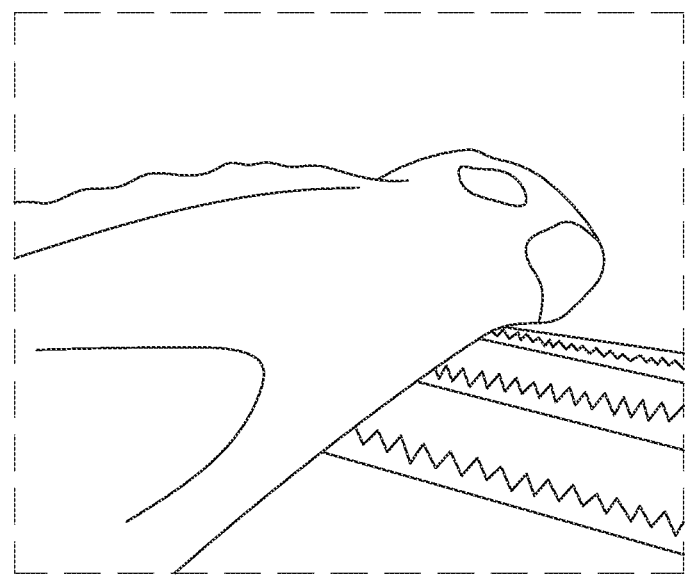
FIG. 3B is a representative diagram of a flipped pork loin with the fat side visible, suitable for identification and classification by the present invention.

As shown in FIGS. 3A and 3B, in one embodiment, a high-resolution image is obtained of pork loin. FIG. 3A is a representative illustration of a flipped rib pork loin. FIG. 3B is a representative illustration of a flipped fat pork loin. In at least these embodiments, the feature detection system 100 can detect multiple features of the pork loin and/or positions of the loin on the conveyor belt 110.

It will be recognized by one skilled in the art that various features and types of meat samples can be analyzed by the systems and processes disclosed herein. Thus, the detection methods described herein can be applied to different meat cuts from the same carcass and similar cuts from a plurality of carcasses.

In some embodiments, the system receives or retrieves feature specification data, which can include but is not limited to a plurality of trim specifications corresponding to each of the primal and sub-primal cuts to be completed by one or more processing units 180 or other processing devices of the system. In some embodiments, the plurality of trim specifications may include detailed processing options regarding one or more of the following: skin-on, skin-off, bone-in, boneless, target separation for a blade bone cross section, the presence or absence or protrusion(s), cut dimensions, muscle dimension(s), fat depth and/or thickness, and an attachment or removal of specific muscles, bones, and/or other carcass components.

Figure 4:
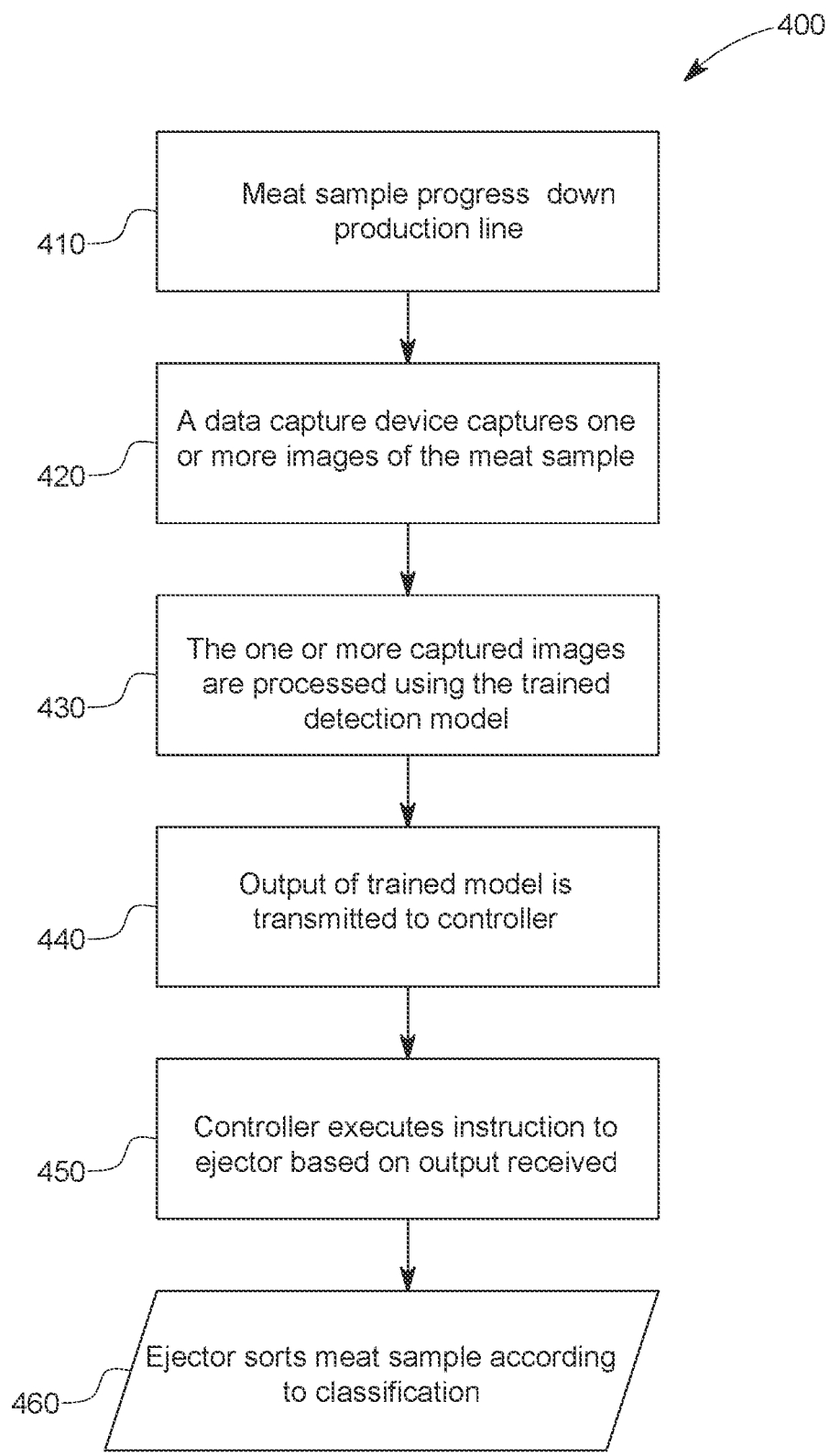
FIG. 4 is a flow diagram of a process for evaluating a meat sample as an input of an advanced detection training model for determining the presence or absence of a feature in the meat sample in accordance with an embodiment of the present invention.
Figure 5:
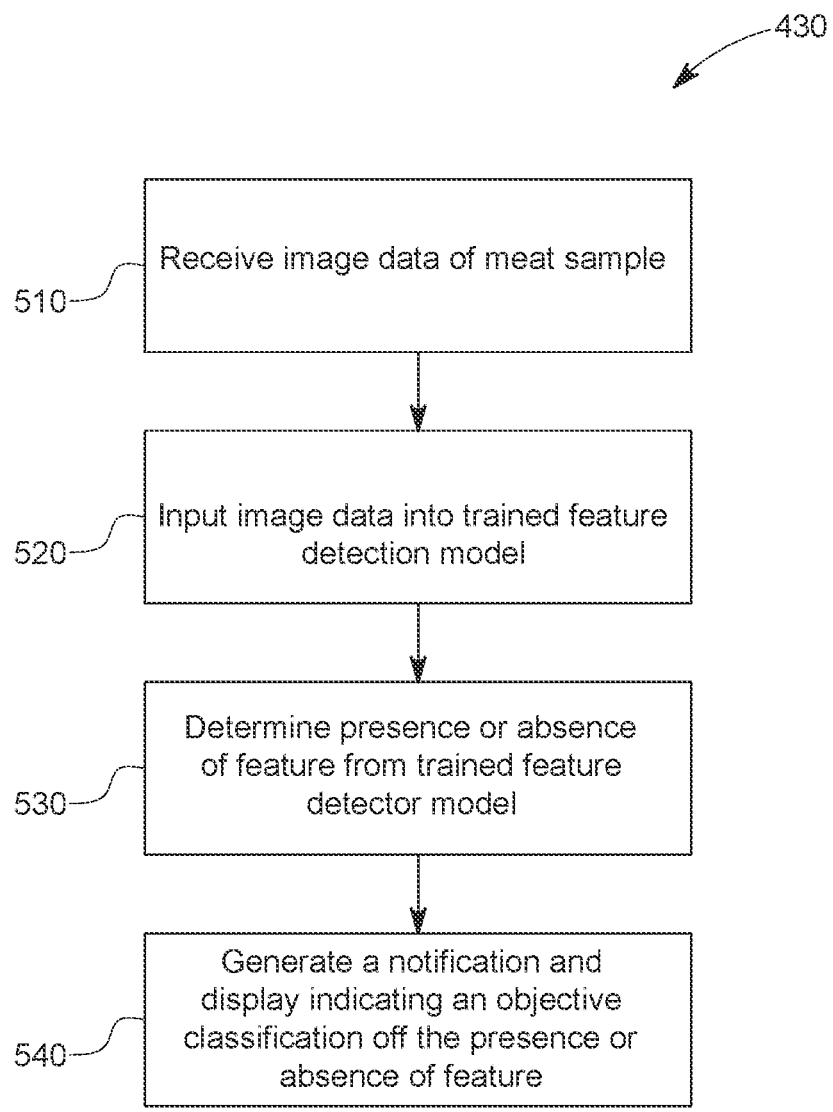
FIG. 5 is a flow diagram of a process for evaluating a meat sample as an input of the trained feature detection model for determining the presence or absence of a feature in the meat sample in accordance with an embodiment of the present invention.
Figure 6:
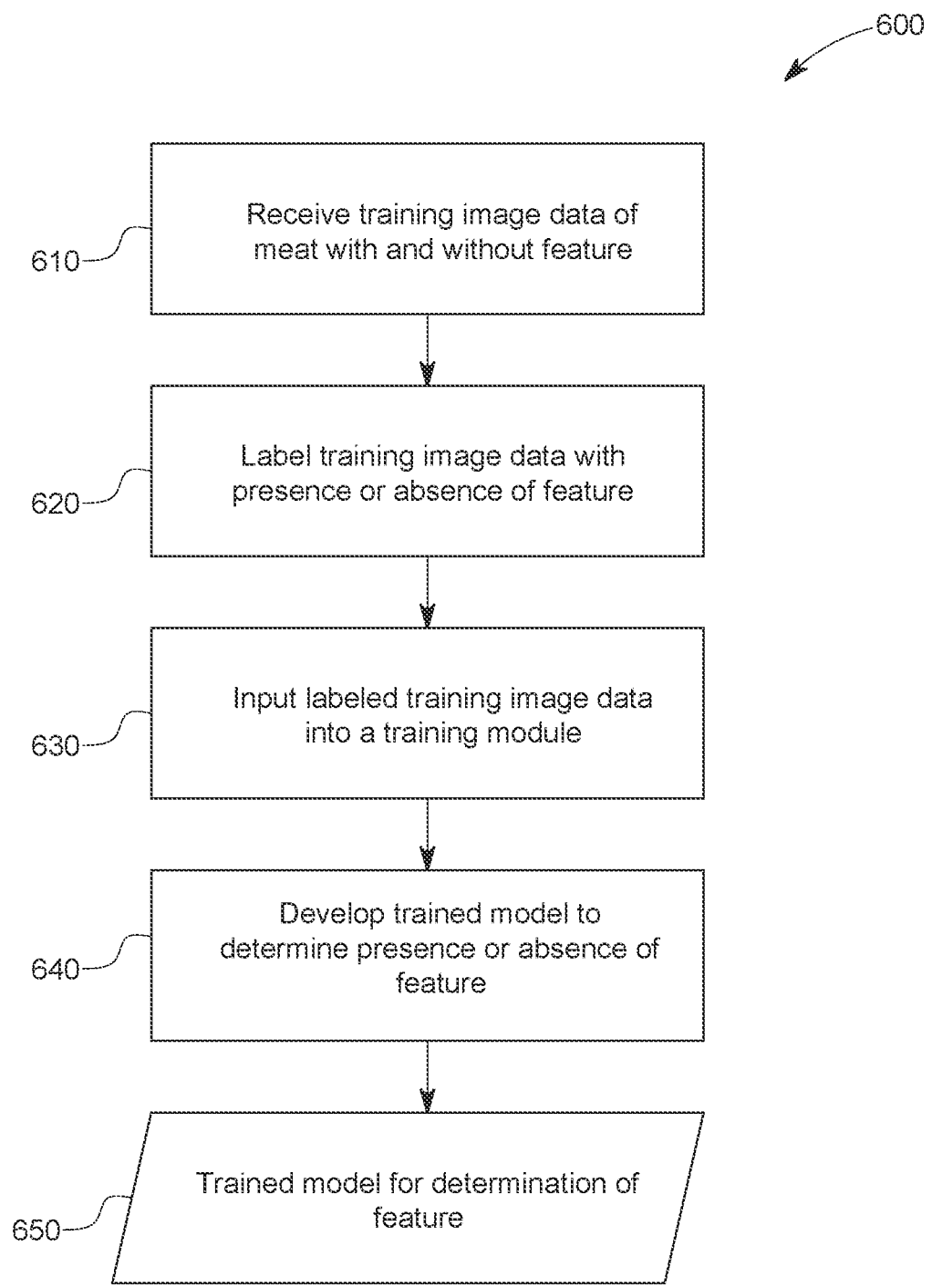
FIG. 6 is a flow diagram of a process for developing a trained feature detection model for determining the presence or absence of a feature in a meat sample in accordance with an embodiment of the present invention.

FIGS. 4-6 are flow diagrams illustrating the training and operation of one or more detection models 130, according to one representative embodiment. The process includes two main phases: inference (operation) of the one or more feature detection models 130 (FIG. 5) and iteratively training the one or more feature detection models 130 (FIG. 6).

When used throughout the present disclosure, one skilled in the art will understand that processes for "iteratively training the training module" can include machine learning processes, artificial intelligence processes, and other similar advanced machine learning processes. For example, the system and processes of the present disclosure can predict a pass/fail objective classification for a plurality of meat samples having different individualized parameters and can leverage the known characteristics of meat samples with similar metrics as an input to an iterative training process for an automated detection and objective classification of a feature based on a plurality of parameters. A representative, non-limiting example of trained learning is shown in FIG. 4, in one embodiment, a trained feature model may be developed and used in a feature detection process 400 to determine the presence or absence of one or more of a plurality of features in meat samples. First, image data of meat samples is received or otherwise collected 410. The image data of the meat sample may be received 410 by one or more data capture devices 120, such as a camera or other imaging device. In some embodiments, the image data of the meat sample can be obtained while the meat is being transported by the conveyor belt system 110, or similar transport system, as described in more detail in connection with FIG. 1.

In some embodiments, the image data includes image files, video files, or other data elements 125 as described in connection with FIG. 1. In some embodiments, the image data can include 2D image files, 3D image files, digital files, or video files of meat samples with or without a plurality of features. In some embodiments, the image data capture system used to obtain the training image data (as described in connection with FIG. 6) is the same as the image data capture system that will be used to obtain image data of the meat samples after the trained image analysis model is created. In some embodiments, low-quality images (e.g., blurry, too dark, too bright, etc.) can be automatically excluded from the image data. In some embodiment, the image data may be pre-processed, filtered, or otherwise analyzed, edited, or processed before step 420 or throughout other steps of the feature detection process 400.

In some embodiments, the image data of the meat sample is input into a trained image analysis model at step 430. The trained image analysis model may be operating on a computing device, such as a local computing device at the image data capture system or a remote computing device from the local computing device. The trained image analysis model can be designed to detect the presence or absence of one or more features based on the image data. The trained image analysis model analyzes the image data and makes a determination of the presence or absence of a feature at step 430, described in more detail in FIG. 5.

In some embodiments, the determination of the presence or absence of a feature at step 430 may further include an indication of a degree of certainty as to the determination. In some embodiments, the indication of the degree of certainty can include a validation process and a calculation of an error metric.

In one specific example, the determination of the presence of a feature (e.g., backfinning) of the meat sample is communicated to a controller 160 communicatively coupled to a routing system that can be designed to route meat samples on a transportation system using an ejector of similar processing unit 180 based on receiving a signal from the controller at step 450. In this example, the ejector can move a loin or other meat sample to a particular processing line based on the presence or absence of a feature at step 460, such as routing backfinned samples so they do not appear in the bone-in loin processing line. In some embodiments, the ejector or other processing unit 180 can route meat samples to a specific processing station, cutting station, packaging station, and/or labeling station based on the presence or absence of one or more features. In some embodiments, the ejector or processing unit can push or move a meat sample to a production line with a scale to be weighed. In at least this way, the feature detection system 100 can provide fine-tuned and customized process sorting instructions based on one or more factors, including the output of the feature detection model and the weight of the meat sample. In another embodiment, the weight is not used in sorting and processing one or more meat samples.

In some embodiments, the trained model can be developed based on input vectors, which are indicative of a characteristic of the meat samples. In one example, the input vector may be the variation in the color of the pixels of the meat sample. In one example, the variation of the color may indicate a level of marbling of the meat sample. In other examples, the input vectors may be colors in the visible spectrum, peaks of wavelengths detected in non-visible electromagnetic energy (e.g., ultraviolet, infrared), the presence and numbers of different types of non-meat tissue (e.g., bone, fat), the presence and/or absence of a cut, the presence and/or absence of featherbones, one or more defects, or any other number of possible input vectors or parameters.

In one embodiment, the input vector may be visible backfinned featherbone boundaries visible along the interior surface of a loin, including color, size, shape etc. The use of input vectors for training may help the trained detection model identify the presence or absence of a feature in a meat sample without characteristics that a person would normally look for when manually identifying the type of the meat sample. The use of the input vectors allows the trained detection model to detect the type of the meat sample without the need for a human to identify the meat samples. After the input vectors are modeled, a trained detection model can be developed as a decision-making process based on a number of the input vectors. Examples of decision-making processes include decision trees, neural networks, and the like. In some embodiments, the decision-making process of the trained detection model is based on a determination of an acceptable arrangement of the input vectors in the decision-making process.

As shown in FIG. 5, the trained detection model can further be used to perform advanced image analysis techniques on the one or more data elements 125 during the detection step 430 to identify the presence or absence of a feature in a meat sample. In some embodiments, the images collected from the one or more data capture devices 120 in step 420 of FIG. 4, are received or retrieved by the trained detection model at step 510. The image(s) are then used as an input to the detection model at step 520. As described in connection with FIG. 4, once the trained image analysis model makes the determination of an objective identification and classification of a feature at step 530, the system can generate a notification at step 540 and communicate the feature identification to one or more controllers 160. In some embodiments, the feature detection process at step 530 is performed by matching one or more feature parameters of the trained detection model with one or more feature parameters of the input image data. In this embodiment, the system identifies the presence or absence of one or more features in the meat sample. In some embodiments, the notification system 170 generates the notification. In some embodiments, the notification can be received by one or more display or other user interface devices. The notification may also be communicated via a communication interface to one or more external devices, communicated over the network 150, stored in one or more databases 140, or another output method.

As depicted in FIG. 6, in one embodiment, the iterative training process 600 for iteratively training the one or more detection models 130 begins with receiving or otherwise obtaining image data of meat cuts or samples with and without a feature. The image data will be labeled for the presence or absence of a feature by visual inspection 620. In some embodiments, step 620 can be completed by a human. In another embodiment, the step 620 can be completed by an automated image processing or analysis system, a robotic system, an artificial intelligence system, or similar. In one example, an image can be tagged (either by user input or via image processing analysis techniques) as being an image of a backfinned loin. This image can be stored in the one or more databases 140, including the associated feature parameters associated with the image. The image data and feature parameters can then be matched to other images to determine if they also have the backfinned feature. In some embodiments, low-quality images (e.g., blurry, too dark, too bright, etc.) were excluded from the training image data.

The labeled training image data can then be input into a training module 630. In some embodiments, the labeled training image can be validated by either manual or automated techniques before the input step 630. The labeled training image data is used to iteratively train or teach the detection model to identify a feature in a meat sample 640. After the training module, a trained feature detection model for determining the presence or absence of a feature is developed 650.

In some embodiments, the trained detection model includes a neural network that has several layers. In one embodiment, the neural network is a multilayer neural network. In some embodiments, the input nodes represent inputs into the trained models (e.g., image data, metadata associated with the image data, etc.), one or more of the hidden nodes (e.g., one of the layers of hidden nodes) may represent one of the input vectors determined during the development of the detection model, and the output node represents the determined type of the meat being analyzed. In some embodiments, to iteratively train the one or more detection models 130, the system can compare a set of training outcomes from each of a plurality of training data sets and update one or more emphasis guidelines, classification values, characteristics, parameters, or similar. Additionally, in some embodiments, the comparison of the plurality of training data set outcomes can allow for the calculation of one or more error metrics between the input data and the output data. In at least one embodiment, the system can include a plurality of detection models 130, configured to generate outcomes, predictions, or classifications based on a particular data element characteristic. In some embodiments, the particular data element characteristic can include parameters related to the meat sample, a specific feature, the type of carcass, or one or more image capture considerations (e.g., illumination consistency, glare, color, etc.). The trained detection model can be implemented for determining the presence or absence of a feature in a meat sample as outlined in FIGS. 4 and 5.

In some embodiments, a training module performs the iterative training of the one or more detection models 130. In some embodiments, the one or more detection models 130 can include an architecture with a certain number of layers and nodes, with biases and emphasis guidelines between the nodes. During training, the training module can determine the values of parameters weights and biases) of the machine learning model, based on a set of training samples. In one embodiment, the training module receives a training set for training. The training samples in the training set can include images captured by the camera. For supervised learning, the training set typically also includes tags or labels for the images. The tags or labels can include whether or not the meat sample has a particular feature.

In an example of iterative training, a training sample is presented as an input to the one or more detection models 130, which then produces an output for a particular feature. The difference between the output of the one or more detection models 130 and a known output is used by the training module to evaluate and adjust (as needed) the values of the parameters in the one or more detection models 130. This is iteratively repeated for a plurality of training samples to improve the performance of the one or more detection models 130.

The training module can also validate the trained the one or more detection models 130 based on additional validation samples. For example, the training module applies the one or more detection models 130 to a validation sample set to quantify the accuracy of the one or more detection models 130. The validation sample set can include images with associated known attributes. The output of the one or more detection models 130 can be compared to the known attributes of the validation sample set. In one embodiment, developing the one or more detection models 130 can include using validation data to compare to training data to determine if the one or more detection models 130 was being overfitted to the training data.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations, locations, etc. have been described for use with disclosed embodiments, others besides those disclosed may be utilized without exceeding the scope of the invention.

Persons of ordinary skill in the relevant arts will recognize that the subject matter hereof may comprise fewer features than illustrated in any of the individual embodiments described above. The embodiments described herein are not meant to be an exhaustive presentation of how the various features of the subject matter herein may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical, or other property, such as, for example, molecular weight, viscosity, etc., is from 100 to 1,000, it is intended that all individual values, such as 100, 101, 102, etc., and sub-ranges, such as 100 to 144, 155 to 170, 197 to 200, etc., are expressly enumerated. For ranges containing values that are less than one or containing fractional numbers greater than one (e.g., 1.1, 1.5, etc.), one unit is considered to be 0.0001, 0.001, 0.01, or 0.1, as appropriate. For ranges containing singledigit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

As used herein, "a," "an," or "the" can mean one or more than one. For example, "an" image can mean a single image or a plurality of images.

The term "and/or" as used in a phrase such as "A and/or B" herein can include both A and B; A or B; A (alone); and B (alone). Likewise, the term "and/or" as used in a phrase such as "A, B, and/or C" can include at least the following embodiments: A, B, and C; A, B, or C; A or C; A or B; B or C; A and C; A and B; B and C; A (alone); B (alone); and C (alone).

As used herein, the term "about" when referring to a measurable value such as an amount, a temporal duration, and the like, can include variations of +/−20%, more preferably +/−10%, even more preferably +1-5% from the specified value, as such variations are appropriate to reproduce the disclosed methods and systems.

As used herein, the term "meat" or "meat sample" as used herein can include a meat product, a meat cut, a trim specification, or other composition harvested from an animal.

As used herein, "muscle fiber" can include muscle filaments surrounded by a layer of connective tissue such as endomysium around a muscle fiber core. In some embodiments, the muscle fiber may be a feature detected by the system and method described herein.

As used herein, "lean muscle" can include tissue rich in muscle fiber. As used herein, "non-lean muscle" can include tissues with fat, gristle, nerve, blood vessels, or other connective tissue, etc.

In some embodiments, the lean muscle or non-lean muscle may be a feature detected by the system and method described herein.

As used herein, "statistical measures" can include the mean, the median, a percentile value, a variance, a standard deviation, or similar statistical measures, such as additional measures that can be derived from the above.

Features can include statistical measures. A feature can include one or a small number of values derived from the pixel values of the one or more data capture devices 120 and/or the plurality of data elements 125. In some embodiments, the features can include color features, shape features, topological features, physiological features (e.g. pH or protease levels), and more. In some embodiments, analysis of the feature can reduce the very large amount of information in an image (often millions of pieces of information, as an image can have millions of pixels, each with multiple intensity values) into a small number of values for use in a decision algorithm. In some embodiments, the analysis of one or more of the features can include "calculating" the features, "computing" the features, "extracting" the features, or other such actions connoting the derivation of the features from the underlying images. In some embodiments, the image analysis and/or extraction can be performed or executed by a computing device, or similar, as described herein.

As used herein, "texture analysis" can include a value or a small number of values that incorporate information about the fine-grained structure of an image. Such information can include local pattern analysis, pixel-to-pixel contrast analysis, and more.

As used herein. "local pattern analysis" can include both local binary patterns as well as numerous other algorithms that have similar or formally identical effects.

As used herein, "topological features" can include features related to the physical arrangement of ultrastructural elements, both in an absolute sense (e.g. a size, distance, or area) as well as relative sense (e.g. relative direction, relative size, relative distance, relative area).

As used herein "color values" can include hue, saturation, lightness, red value, green value, blue value, magenta value, cyan value, yellow value, Lab space value, L*a*b* space value, or any other value derived from obtaining images from specific spectral regions, and which can involve the comparison of such values.

As used herein, "decision algorithms" can include any mapping or other process of assigning features from the high-resolution imaging, and which can additionally include values or attributes determined by means other than high-resolution imaging, into a meat analysis and feature determination.

The constructions described in the accompanying materials and illustrated in the drawings are presented by way of example only and are not intended to limit the concepts and principles of the present invention. Thus, there has been shown, and described several embodiments of a novel invention. As is evident from the description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations, and other uses and applications of the present construction will, however, become apparent to those skilled in the art after considering the specification and the accompanying drawings. All such changes, modifications, variations, and other uses and applications which do not depart from the spirit and scope of the invention are deemed to be covered by the invention which is limited only by the claims which follow.

What is claimed is:

1. A feature detection system configured to analyze a portion of a pork carcass that contains a pork loin, the system comprising:
   a data capture device provided in a form of an image capture device;
   a transport system with the portion of the pork carcass that contains the pork loin positioned in a field of view of the image capture device;
   a feature detection model including a processor configured to:
   process a plurality of data elements received from the data capture device to determine whether there is backfinning in the pork loin; and
   generate an output that indicates whether there is backfinning in the pork loin;
   an ejector configured to:
   sort the pork loin into a backfinned loin processing line when the output indicates that there is backfinning in the pork loin; and
   sort the pork loin into a bone-in loin processing line when the output indicates that there is not backfinning in the pork loin.

2. The system of claim 1 further comprising a notification system designed to generate a notification provided in the form of an identification of the one or more features of the pork loin.

3. The system of claim 2 wherein the identification includes a presence or an absence of backfinning in the pork loin.

4. The system of claim 1 wherein the feature detection model includes an iteratively trained machine learning model.

5. The system of claim 1 wherein the feature detection model includes a training model, a validation model, and a trained model.

6. The system of claim 5 wherein the validation model comprises applying one or more detection models to a validation sample set to quantify the accuracy of the one or more detection models.

7. The system of claim 6 wherein the validation sample set can include images with associated known attributes.

8. The system of claim 1 wherein the plurality of data elements are provided in the form of high-resolution images.

9. The system of claim 1 wherein the image capture device is a camera.

10. A method for determining a feature of a portion of a pork carcass that contains a pork loin, the method comprising the steps of:

capturing a data element provided in a form of an image of the portion of the pork carcass that contains the pork loin;

extracting a feature parameter from the image of the pork loin;

processing the feature parameter using an iteratively trained feature detection training model;

determining, based on the processing of the feature parameter, whether there is backfinning in the pork loin;

responsive to determining that there is backfinning in the pork loin, generating a first signal to an ejector to sort the pork loin into a backfinned processing line; and responsive to determining there is not backfinning in the pork loin, generating a second signal to the ejector to sort the pork loin into a bone-in loin processing line.

11. The method of claim 10 wherein the feature parameter includes an input vector.

12. The method of claim 10 wherein capturing the data element comprises triggering a camera when the meat sample comes within a visual field of the camera.

13. The method of claim 10 wherein capturing the data element comprises obtaining a photo of a visual field of a camera at an interval based on frames per second.

* * * * *